US011550067B2

(12) United States Patent
Reimer et al.

(10) Patent No.: US 11,550,067 B2
(45) Date of Patent: Jan. 10, 2023

(54) SYSTEM AND METHOD FOR FUSING DEAD RECKONING AND GNSS DATA STREAMS

(71) Applicant: Swift Navigation, Inc., San Francisco, CA (US)

(72) Inventors: Christian Reimer, San Francisco, CA (US); Guillaume Decerprit, San Francisco, CA (US); Richard Deurloo, San Francisco, CA (US); Sébastien Carcanague, San Francisco, CA (US); Joseph Angelo, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/554,993

(22) Filed: Dec. 17, 2021

(65) Prior Publication Data

US 2022/0196852 A1 Jun. 23, 2022

Related U.S. Application Data

(60) Provisional application No. 63/126,765, filed on Dec. 17, 2020.

(51) Int. Cl.
*G01S 19/49* (2010.01)
*G01S 19/25* (2010.01)
*G01S 19/54* (2010.01)
*G01S 19/43* (2010.01)

(52) U.S. Cl.
CPC ............ *G01S 19/49* (2013.01); *G01S 19/258* (2013.01); *G01S 19/43* (2013.01); *G01S 19/54* (2013.01)

(58) Field of Classification Search
CPC ........ G01S 19/258; G01S 19/43; G01S 19/49; G01S 19/54
See application file for complete search history.

(56) References Cited

U.S. PATENT DOCUMENTS

| 5,610,614 | A | 3/1997 | Talbot et al. |
| 6,427,122 | B1 | 7/2002 | Lin |
| 6,453,237 | B1 | 9/2002 | Fuchs et al. |
| 6,647,340 | B1 | 11/2003 | Pemble et al. |
| 6,691,066 | B1 | 2/2004 | Brodie |

(Continued)

FOREIGN PATENT DOCUMENTS

| CN | 103760573 A | 4/2014 |
| CN | 105629263 B | 4/2019 |

(Continued)

OTHER PUBLICATIONS

"Geo++ SSR For Network-RTK, PPP and PPP-RTK", https://geopp.de/wp-content/uploads/2020/09/SSR_Flyer_v3.pdf.

(Continued)

*Primary Examiner* — Dao L Phan
(74) *Attorney, Agent, or Firm* — Jeffrey Schox; Randy Mehlenbacher

(57) ABSTRACT

A method can include receiving sensor data, receiving satellite observations, determining a positioning solution (e.g., PVT solution, PVA solution, kinematic parameters, etc.) based on the sensor data and the satellite observations. A system can include a sensor, a GNSS receiver, and a processor configured to determine a positioning solution based on readings from the sensor and the GNSS receiver.

11 Claims, 5 Drawing Sheets

(56) References Cited

U.S. PATENT DOCUMENTS

| | | |
|---|---|---|
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,692,578 B2 | 4/2010 | Vollath et al. |
| 7,696,922 B2 | 4/2010 | Nicholson et al. |
| 8,094,065 B2 | 1/2012 | Henkel |
| 8,193,976 B2 | 6/2012 | Shen et al. |
| 8,447,517 B2 | 5/2013 | Roh |
| 8,542,146 B2 | 9/2013 | Vollath |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 * | 5/2015 | Lemay .................. G06T 7/73 701/445 |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,557,422 B1 | 1/2017 | Miller et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 10,101,464 B2 | 10/2018 | Appleford et al. |
| 10,260,888 B2 | 4/2019 | Takahashi |
| 10,274,606 B1 | 4/2019 | Phan et al. |
| 10,677,933 B1 | 6/2020 | Gavrilets et al. |
| 10,809,388 B1 | 10/2020 | Carcanague et al. |
| 11,156,718 B2 | 10/2021 | Takeda |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2015/0019464 A1 | 1/2015 | Nguyen-Tuong et al. |
| 2015/0260848 A1 | 9/2015 | Mundt et al. |
| 2015/0293230 A1 | 10/2015 | Weed et al. |
| 2015/0293233 A1 | 10/2015 | De Jong |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 * | 10/2018 | Laine .................. G01S 5/0072 |
| 2019/0004180 A1 | 1/2019 | Jokinen |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0302274 A1 | 10/2019 | Berntorp et al. |
| 2019/0339396 A1 | 11/2019 | Turunen |
| 2020/0025936 A1 | 1/2020 | Zhou et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2021/0033735 A1 | 2/2021 | Kleeman |

FOREIGN PATENT DOCUMENTS

| | | |
|---|---|---|
| CN | 107422354 B | 6/2019 |
| CN | 114174850 A | 3/2022 |
| EP | 0244091 A2 | 11/1987 |
| EP | 2602752 A1 | 6/2013 |
| EP | 1839070 B2 | 4/2014 |
| EP | 2966477 A1 | 1/2016 |
| EP | 3627188 A1 | 3/2020 |
| WO | 2017046914 A1 | 3/2017 |
| WO | 2017070732 A1 | 5/2017 |

OTHER PUBLICATIONS

"Integrity-Navipedia", https://gssc.esa.int/navipedia/index.php/Integrity, published 2011.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

"An Introduction to GNSS, Chapter 4, GNSS Error Sources", https://novatel.com/an-introduction-to-gnss/chapter-4-gnsserrorsources, published 2015.

"IGS State Space Representation (SSR) Format Version 1.00", International GNSS Service (IGS), Oct. 5, 2020.

(56) References Cited

OTHER PUBLICATIONS

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"Safe Position Augmentation for Real-Time Navigation (SPARTN) Interface Control Document Version 1.8.0", Jan. 2020, Sapcorda Services GmbH.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application To GNSS", Artificial Satellites, vol. 51, No. 4—2016 DOI: 10.1515/arsa-2016-0011.

Brocard, Philippe, "Integrity monitoring for mobile users in urban environment", https://tel.archives-ouvertes.fr/tel-01379632/doument, submitted Oct. 11, 2016.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

Favey, Etienne, et al., "Dead reckoning fills-in GPS navigation gap", EE Times, Automotive Designline, Aug. 18, 2011.

Feng, Shaun, et al., "Carrier phase-based integrity monitoring for high-accuracy positioning", GPS Solution, Apr. 2009.

Gratton, Livio, et al., "Carrier Phase Relative RAIM Algorithms and Protection Level Derivation", Journal of Navigation (2010), 63, 215-231, doi: 10.1017/S0373463309990403.

Gunning, Kazuma, et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, Dr. Rui, "Recent Activity of International Standardization for High-Accuracy GNSS Correction Service", Mitsubishi Electric, Jun. 27, 2019.

Huang, Panpan, "Airborne GNSS PPP Based Pseudolite System", School of Civil and Environmental Engineering Faculty of Engineering UNSW. Jun. 2019.

Karaim, Malek, et al., "GNSS Error Sources", https://www.intechopen.com/books/multifunctional-operation-and-application-of-gps/gnss-error-sources, published Apr. 6, 2018.

Khanafseh, Samer, et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.

Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Ko, Jonathan, et al., "GP-UKF: Unscented kalman filters with Gaussian process prediction and observation models", Conference Paper, Dec. 2007, 10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu, et al., "Prediction of Navigation Satellite Clock Bias by Gaussian Process Regression", Lecture Notes in Electrical Engineering 342:411-423, Jan. 2015.

Li, T., et al., "Some remarks on GNSS integer ambiguity validation methods", Survey Review, Dec. 5, 2012, vol. 44, No. 326.

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Meng, Xiaoli, et al., "A Robust Vehicle Localization Approach Based on GNSS/IMU/DMI/LiDAR Sensor Fusion for Autonomous Vehicles", Sensors, 2017, 17,2140.

Odijk, Dennis, et al., "On the estimability of parameters in undifferenced, uncombined GNSS network and PPP-RTK user models by means of S-system theory", Journal of Geodesy, Nov. 2015.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Ervan, Boris, et al., "Shaping Aviation Integrity Two RAIMs for Safety", GPS World The Business and Technology of Global Navigation and Positioning, Apr. 1, 2008.

Phelts, R. Eric, et al., "Innovation: Improving ARAIM, An approach using precise point positioning", GPS World, Jun. 13, 2020, https://www.gpsworld.com/innovation-improving-araim/.

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E., et al., "Gaussian Processes for Machine Learning", MIT Press, 2006, ISBN 026218253X. c 2006 Massachusetts Institute of Technology, (Year: 2006).

Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Satirapod, Chalermehon, "Improving the GPS Data Processing Algorithm for Precise Static Relative Positioning", School of Surveying and Spatial Information Systems The University of New South Wales Jan. 2002.

Schmitz, Martin, "RTCM State Space Representation Messages, Status and Plans", PPP-RTK & Open Standards Symposium, Mar. 12-13, 2012, Frankfurt, Germany.

Skog, Isaac, et al., "A Low-Cost GPS Aided Inertial Navigation System for Vehicle Applications", 2005 13th European Signal Processing Conference, Sep. 4-8, 2005.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

(56) References Cited

OTHER PUBLICATIONS

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

"RAIM", GMV, 2011, RAIM.

\* cited by examiner

SYSTEM AND METHOD FOR FUSING DEAD RECKONING AND GNSS DATA STREAMS

CROSS-REFERENCE TO RELATED APPLICATIONS

This application claims the benefit of U.S. Provisional Application No. 63/126,765, filed 17 Dec. 2020, which is incorporated in its entirety by this reference.

TECHNICAL FIELD

This invention relates generally to the positioning field, and more specifically to a new and useful system and method in the positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
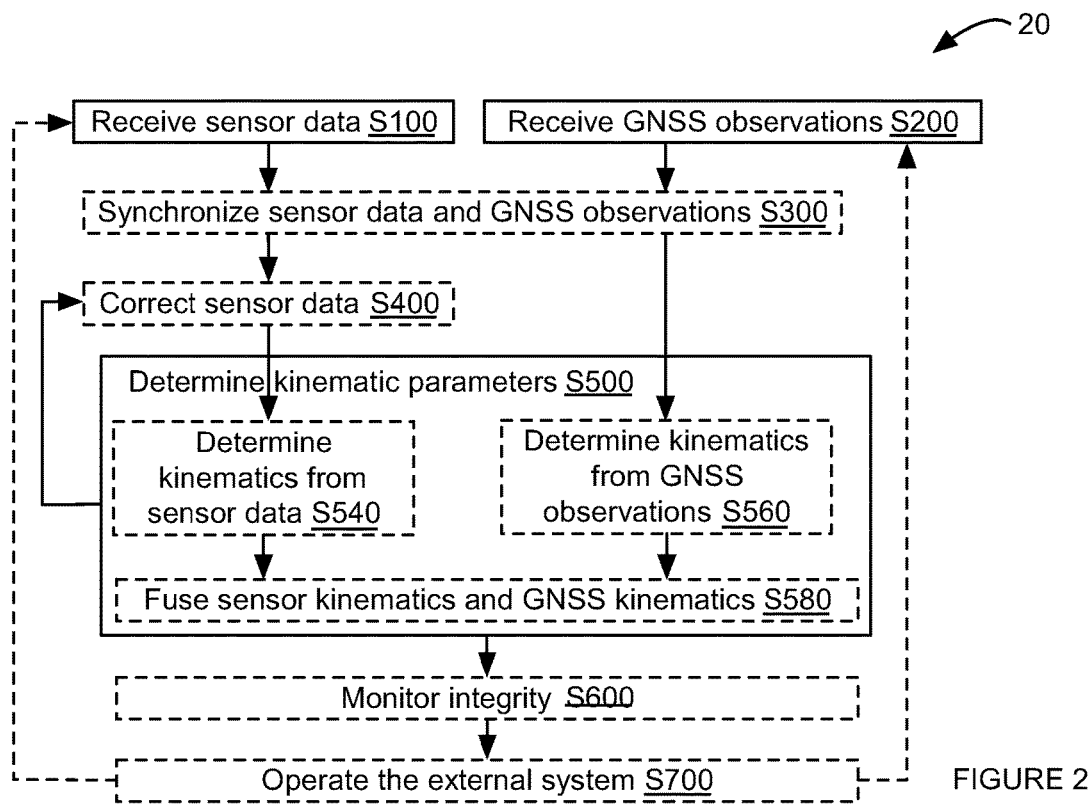
FIG. 2 is a schematic representation of the method.

As shown in FIG. 2, the method 20 can include receiving sensor data S100, receiving GNSS observations S200, and determining kinematic parameters S500. The method can optionally include: synchronizing the sensor data and GNSS observations S300, correcting the sensor data S400, monitoring the integrity of the kinematic parameters S600, operating an external system S700, and/or any suitable steps.

Figure 1:
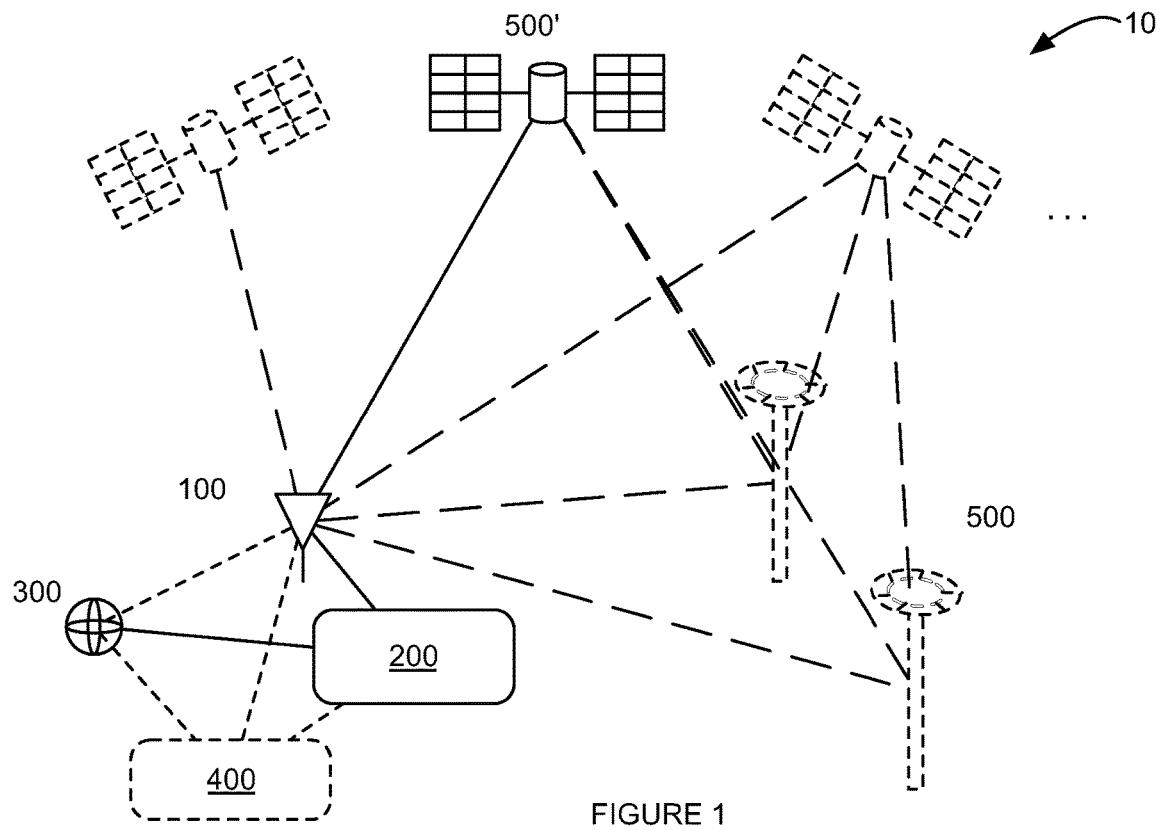
FIG. 1 is a schematic representation of the system.

As shown in FIG. 1, the system 10 can include one or more GNSS receivers 100 (e.g., one or more antennas), a computing system 200, and one or more sensors 300. The system is preferably communicably connected to one or more data sources 500, 500' (e.g., reference stations, satellites, satellite constellations, remote computing systems, databases, etc.).

The system and method preferably function to determine (e.g., estimate, calculate, filter, etc.) kinematic parameters (e.g., position, velocity, acceleration, attitude, precise time, position velocity attitude (PVA) solutions, position velocity time (PVT) solutions, etc.) of a GNSS receiver and/or an external system 400 (e.g., coupled to the GNSS receiver and/or sensor). Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning and/or location data, integrity data (e.g., protection level data), and/or other data to said system.

2. Benefits

Variations of the technology can confer several benefits and/or advantages.

First, variants of the technology can increase the availability of a positioning solution transmitted to a system by fusing positioning solutions that are low-rate and long-term time stable (but can have high short-term errors; such as from satellite observations) with positioning solutions that are high-rate with good short-term stability (but can have high long-term errors; such as from IMU data). By fusing these solutions, the technology can improve (e.g., better accuracy, better integrity, better availability, etc.) the positioning solutions as compared to using the solutions independently.

Second, the inventors have discovered that by selectively determining kinematic parameters (e.g., applying nonholonomic constraints to constrain the solutions, halting one or more solutions, etc.) based on a motion state of an external system (and/or sensor or GNSS receiver) can improve the positioning solutions and/or decrease the computational overhead used during the determination. For example, when an external system (e.g., a vehicle) is moving in rectilinear motion, nonholonomic constraints can be applied to the vehicle position limiting generation of spurious solutions to the vehicle kinematic parameters. When the external system is moving in curvilinear motion (e.g., angular velocity greater than a threshold angular velocity, turning, in a round-about, angular acceleration greater than a threshold angular acceleration, etc.), the external system kinematic parameters can be determined without applying (or with applying a smaller number of) nonholonomic constraints (e.g., because there can be cross-talk between states). When the external system is stationary (e.g., velocity less than a threshold velocity, external system stopped, external system operation paused, etc.), the external system kinematic parameters can be determined using zero-velocity updates (particularly kinematic parameters determined using sensor data). However, the motion state (e.g., motion profile) can otherwise be used to modify the kinematic parameter determination.

Third, variants of the technology can enable attitude determination (e.g., alignment) when a GNSS receiver (e.g., external system to which the GNSS receiver is connected) is traveling at low velocity (e.g., less than a threshold velocity; less than about 0.5 m/s, 1 m/s, 2 m/s, 3 m/s, 5 m/s, 6 m/s, 7.5 m/s, 9 m/s, 10 m/s, values therebetween, etc.). Attitude determination can be challenging at low velocity as biases and/or errors are magnified in the attitude determination. For example, by trying to align using two (or more) hypotheses (e.g., a forward and backward hypothesis) and testing the hypotheses to determine the more-likely attitude (e.g., alignment) can enable low velocity attitude determination.

However, variants of the technology can confer any other suitable benefits and/or advantages.

3. System

The system 10 preferably functions to determine the position of a receiver and/or external system, determine a plurality of state vectors, validate the state vectors, and/or can otherwise function. As shown in FIG. 1, the system includes one or more GNSS receivers 100 (e.g., one or more antennas 150), a computing system 200, and one or more sensors 300.

The system 10 preferably uses a set of data collected by one or more data sources. Data sources can include: receivers, sensors (e.g., located onboard the receiver, the external system, a reference station, etc.), databases, reference stations, satellites, and/or any other suitable data source. Examples of data that can be used include: satellite observations, sensor data, and/or any other suitable data.

The GNSS receiver 100 preferably functions to receive a set of satellite observations (e.g., satellite signals) from one or more satellites. In variants, the receiver can determine the location (e.g., by using pseudoranges, by using carrier phase) of the GNSS receiver (e.g., the receiver antenna 150, the external system, etc.) based on the satellite observations and/or sensor readings. The GNSS receiver can be in communication with a computing system, can include a computing system (e.g., a processor, a positioning engine, a fusion engine, etc.), can be integrated with the computing system, and/or the GNSS receiver and computing system can be arranged in any suitable manner. The GNSS receiver can be a stand-alone device (e.g., a stand-alone antenna or set of antennas), can be integrated into the external system (e.g., be a component of an automobile, aero vehicle, nautical vehicle, etc.), can be (e.g., be included in, be a component of, be a chip of, etc.) a user device (e.g., smart phone, laptop, cell phone, smart watch, etc.), and/or can be configured in any suitable manner.

The set of satellite observations can include orbital data, timestamp, range rate data, carrier phase data, pseudorange data, doppler data, and/or any suitable data. The set of satellite observations can be associated with metadata (e.g., ephemeris), and/or any suitable data. The set of satellite observations preferably includes satellite observations corresponding to satellites from more than one satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data. Each satellite observation from the set of satellite observations preferably corresponds to a common time window (e.g., epoch). However, each satellite observation can be associated with a timestamp (e.g., time of transmission, time of receipt, time of processing, etc.), and/or the satellite observations can have any suitable timing.

In variants of the system including more than one receiver (e.g., more than one antenna 150, 150'), each receiver can be configured to receive satellite observations associated a satellite constellation, a carrier frequency (e.g., the L1, L2, L5, E1, E5a, E5b, Eab, E6, G1, G3, B1, B2, B3, LEX, etc. frequencies), and/or corresponding to any suitable data.

The GNSS receiver can be in communication with a correction service (e.g., a networked correction service, PPP correction service, PPP-RTK correction service, SSR correction service, RTK correction service, etc.), which can provide corrections (e.g., for spatially invariant corrections such as clock, orbit, hardware bias, etc.; for spatially variant corrections such as ionosphere delay, troposphere delay, etc.; etc. such as those as disclosed in U.S. patent application Ser. No. 16/589,932 filed 1 Oct. 2019 entitled "SYSTEMS AND METHODS FOR DISTRIBUTED DENSE NETWORK PROCESSING OF SATELLITE POSITIONING DATA" and/or U.S. patent application Ser. No. 16/983,706 filed 3 Aug. 2020 entitled "SYSTEM AND METHOD FOR GAUSSIAN PROCESS ENHANCED GNSS CORRECTIONS GENERATION," each of which is incorporated in its entirety by this reference) for one or more of the satellite observations. In a specific example, the corrections can be provided and/or used as disclosed in U.S. patent application Ser. No. 17/379,271 filed 19 Jul. 2021 entitled "SYSTEM AND METHOD FOR PROVIDING GNSS CORRECTIONS" and/or in U.S. patent application Ser. No. 17/374,523 filed 13 Jul. 2021 entitled "SYSTEM AND METHOD FOR DETERMINING GNSS POSITIONING CORRECTIONS," each of which is incorporated in its entirety by this reference.

The sensor(s) 300, 300', 300" preferably function to measure sensor data associated with the external system and/or the GNSS receiver. The sensor data is preferably used to determine (e.g., independent of the satellite observations) the external system (or the sensor) kinematic parameters, but can additionally or alternatively be used to assist (e.g., speed-up, correct, refine, etc.) the calculation (e.g., calculating the state vector, estimating the phase ambiguity) of kinematic parameters from the satellite observations and/or be otherwise used. The sensors are preferably in communication with the computing system, but can be integrated into the computing system, connected to the computing system, be separate from the computing system (e.g., connect to the computing system through an intermediary system), and/or can otherwise be arranged.

The sensor(s) can be: on-board the external system, on-board a separate external system, integrated into the GNSS receiver, separate from the GNSS receiver, and/or otherwise associated with the GNSS receiver.

The sensor data can include: inertial data (e.g., velocity, acceleration, angular velocity, angular acceleration, etc.), odometry, distance, pose (e.g., position, orientation, etc.), mapping data (e.g., images, point clouds), temperature, pressure, ambient light, landmarks (e.g., image key features), images, video feeds, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), distance measurement instrument, image sensor (e.g., camera), pressure sensors, and/or any suitable sensor.

The system can include more than one antenna and/or sensor, which can function to provide redundancy, provide information in the event of an outage to one of the antennas or sensors, provide validation and/or cross checks between data sources, and/or otherwise function. The relative pose (e.g., a 'leverarm') between each GNSS receiver antenna, each sensor, and/or each GNSS receiver/sensor pair is preferably known (e.g., known with a sufficient accuracy such as within 1 mm, 5 mm, 1 cm, 5 cm, 1 dm, etc.), but can be unknown (e.g., variable, known with an accuracy greater than 1 dm, etc.). The leverarm is preferably fixed (e.g., rigidly fixed), but can vary and/or change (e.g., during external system operation). The leverarm can be estimated (e.g., included as a state of a filter, estimated by a fusion engine, estimated by a GNSS filter, estimated by a DR filter, etc.), accounted for in a measurement covariance (e.g., within a measurement model that is processed as part of a filter), and/or can otherwise be account for. When multiple leverarms are present (e.g., three or more total antennas and/or sensors), each leverarm can be accounted for in the same or different manner. For instance, a sensor/antenna leverarm can be accounted for in a measurement covariance and an antenna/antenna leverarm can be accounted for as a state of a filter. However, the leverarm can otherwise be accounted for, modeled, and/or determined.

When the system includes more than one sensor, each sensor can be the same or different. In a first illustrative example, the system can include a plurality of IMU sensors. In a second illustrative example, the system can include an IMU sensor (e.g., accelerometer and gyroscope) and a wheel tick sensor. However, any suitable sensors can be used.

The sensor(s) (and/or the GNSS receiver) can be high-rate, low-rate, and/or have any suitable rate (e.g., sensor data acquisition frequency). The sensor(s) (and/or the GNSS receiver) can have a high-latency, low-latency, and/or any suitable latency.

The computing system preferably functions to perform all or part of the method and/or process data (e.g., satellite observations, reference station observations, sensor data, etc.) received by the GNSS receiver(s) and/or the sensor(s), but can otherwise function (e.g., to generate operating instructions for an external system based on the PVA solution, kinematic parameters, etc.). The computing system can: aggregate the data (e.g., combine the receiver satellite observations, reference station satellite observations, satellite corrections, and/or sensor data; reorganize the receiver satellite observations, reference station satellite observations, and/or sensor data such as based on the timestamp, time of transmission, time of receipt, etc.; etc.), filter the data (e.g., to calculate state vectors, ambiguities such as phase ambiguities, etc. associated with the data), calculate the receiver position (e.g., based on the ambiguities), calculate the external system location, correct the data (e.g., correct the satellite observations for clock errors, hardware bias, atmospheric effects, etc.), and/or can process the data in any suitable manner. The computing system can be local (e.g., to the external system, to the GNSS receiver, to the sensor, etc.), remote (e.g., cloud computing, server, networked, etc.), and/or otherwise distributed.

The computing system is preferably communicably coupled to the GNSS receiver(s) and/or the sensors, but can be communicably coupled to any suitable data sources. The computing system is preferably colocalized with (e.g., integrated into) the receiver (and/or external system), but the computing system can be remote from the receiver (and/or external system), and/or configured in any suitable manner.

The computing system can include any suitable processors, microprocessors, graphics processing units, computer processing units, memory, and/or any suitable components.

In some variants, the computing system can include one or more: error estimator (e.g., filter, particle filter, Kalman filter, extended Kalman filter, unscented Kalman filter, Monte Carlo simulator, estimator, etc. such as an IMU error estimator, a GNSS error estimator, sensor fusion module, etc. which can function to estimate IMU errors, GNSS errors, time synchronization to account for latencies between data sources, etc.), error modeler (e.g., functional to define error terms, variances, etc. for consideration such as within the error estimator, to define an error model, etc., where error terms can include a simple bias such as a linear bias; higher order bias terms such as quadratic, cubic, quartic, quintic, etc.; other error terms such as scale factors, nonorthogonalities, misalignments, etc.; etc.), positioning engine, fusion engine (e.g., fusion module), sensor engine, a mechanization module (e.g., mechanization engine such as functional to discretize a physical model, etc.), digital signals processor (e.g., low pass filter, high pass filter, bandpass filter, notch filter, etc.), an integration module (e.g., integration engine; dynamic equations such as discretized dynamic equations, continuous dynamic equations, etc.; numerical integrator such as Runge-Kutta integrator, Euler integration, Bortz correction, midpoint rule, extrapolation, adaptive algorithms, Newton-Coates formula, Simpson method, conservative error estimation, quadrature rules, Monte Carlo techniques, sparse grid techniques, Bayesian quadrature techniques, Romberg's method, etc.; etc.), a buffer (e.g., temporary storage), an error compensator (e.g., machine learning algorithm, artificial intelligence, equations, relationships, conditions, look-up table, etc.), an integrity monitor (e.g., machine learning algorithm, artificial intelligence, equations, relationships, conditions, look-up table, etc. such as functional to determine or identify a time integrity flags based on outlier detection, artificial dropouts, etc.), a classifier (e.g., machine learning algorithm, artificial intelligence, equations, relationships, conditions, look-up table, etc.), and/or any suitable components. However, any component (e.g., module, engine, etc.) of the computing system can include and/or perform any suitable algorithm or method. Exemplary connections between computing system modules are shown for instance in FIGS. 3 and 5. However, the computing system can include any suitable modules connected in any suitable manner.

The system (and/or components thereof) can be operable in one or more modes. Different modes can refer to different states being estimated, different modules or component connections, different models (e.g., different mechanization models, different integration methods, etc.), different assumptions within models, different covariances, different signals being received, different signals being processed, and/or can otherwise be distinguished (e.g., between modes). For instance, different modes can be associated with different accuracy, integrity, reliability, satellite availability, motion profiles, types of external system, external system kinematic parameters (e.g., true kinematic parameters, estimated parameters, etc. such as locations, speeds, velocities, angular velocity, angular speed, acceleration, angular acceleration, etc.), communications (e.g., with a corrections service, with a base station, with a remote computing system, etc.), different weather conditions, different travel conditions (e.g., road condition, turbulence, ground condition, etc.), attitude (e.g., a forward mode, a reverse mode, aligned mode, tracking mode, unaligned mode, initialized mode, etc.), and/or be associated with any suitable property(s).

The modes are preferably automatically switched between (e.g., upon a mode condition being met, upon a mode condition failing to be met, based on a probability that a mode condition is met, based on a probability that a mode condition is not met, according to a schedule, according to a planned route, as determined by artificial intelligence module, etc.), but can be manually switched and/or otherwise be switched between.

In an illustrative example, the system can be operable between a curvilinear motion mode and a rectilinear motion mode. The curvilinear motion mode can be active when the system (e.g., GNSS receiver, sensor, external system, etc.) is traveling on a curvilinear path such as engaging in a turn, in a roundabout, making a U-turn, on a road with a curvature less than a threshold curvature (e.g., radius of curvature such as 10 m, 50 m, 100 m, 250 m, 500 m, 1000 m, 1500 m, 3000 m, 5000 m, etc.), curvature in a path the external system progresses on (such as simple curves, compound curves, reverse curves, deviation curves, transition curves, serpentine paths, hairpin turns, valley curves, summit or crest curves, etc.), an angular velocity of the system (or components) exceeds a threshold, and/or other curvilinear path. However, the system can otherwise operate in the curvilinear motion mode. In the curvilinear motion mode, nonholonomic constraints are preferably relaxed (e.g., not applied), which allows the filter to account for (e.g., estimate) cross-talk between states that are coupled by the curvilinear motion (e.g., location, velocity, etc. in axes perpendicular to the direction of travel are coupled during curvilinear motion). The rectilinear motion mode can be active when the system is not in the curvilinear motion mode, when the system is traveling on a path with a curvature greater than a threshold curvature, when a system angular velocity is less than a threshold, and/or under any suitable condition(s). In the rectilinear motion mode, nonholonomic constraints are preferably applied, which allows the filter to neglect (e.g., not estimate) cross-talk between states that are not (or are only weakly) coupled during rectilinear motion (e.g., location, velocity, etc. in axes perpendicular to the direction of travel are poorly coupled during rectilinear motion), which can improve an accuracy of the output states from the filter, can improve a processing speed of the filter, can decrease power required by the filter, and/or can otherwise be beneficial. However, the curvilinear and/or rectilinear motion modes can otherwise operate (e.g., have different process noise covariance, observation noise covariance, different state transition models, observation models, control-input model, model, filter type, allocated resources, etc.). For instance, when a gyroscope measurement exceeds a threshold signal (e.g., a threshold determined based on a noise or average signal generated by the gyroscope), the system can operate in the curvilinear motion mode and when the gyroscope measurement is less than the threshold signal the system can operate in the rectilinear motion mode.

In a second specific example, the system can be operable between a nonstationary mode and a stationary mode. The nonstationary mode can be active by default, when the velocity exceeds a threshold velocity (e.g., >0.5 m/s, 1 m/s, 2 m/s, 3 m/s, 4 m/s, 5 m/s, 10 m/s, 20 m/s, 30 m/s, 50 m/s, etc.), after the acceleration exceeds a threshold acceleration (e.g., for a threshold amount of time, a predetermined time after, etc.), and/or in any suitable conditions. The stationary mode can be active by default, when the velocity does not exceed a threshold velocity (e.g., <0.5 m/s, 1 m/s, 2 m/s, 3 m/s, 4 m/s, 5 m/s, 10 m/s, 20 m/s, 30 m/s, 50 m/s, etc.), after the acceleration exceeds a threshold deceleration (e.g., for a threshold amount of time, a predetermined time after, etc.), based on an image classification (e.g., an image identifying a stop sign in front of the system), and/or in any suitable conditions. In the stationary mode, one or more data sources can be excluded from determining the kinematic parameters. For instance, in the stationary mode, zero-velocity updates (ZUPT) can be performed for sensor readings, which can be beneficial for helping a filter track sensor errors (e.g., biases) that keep changing while the system is stationary.

Figure 8:
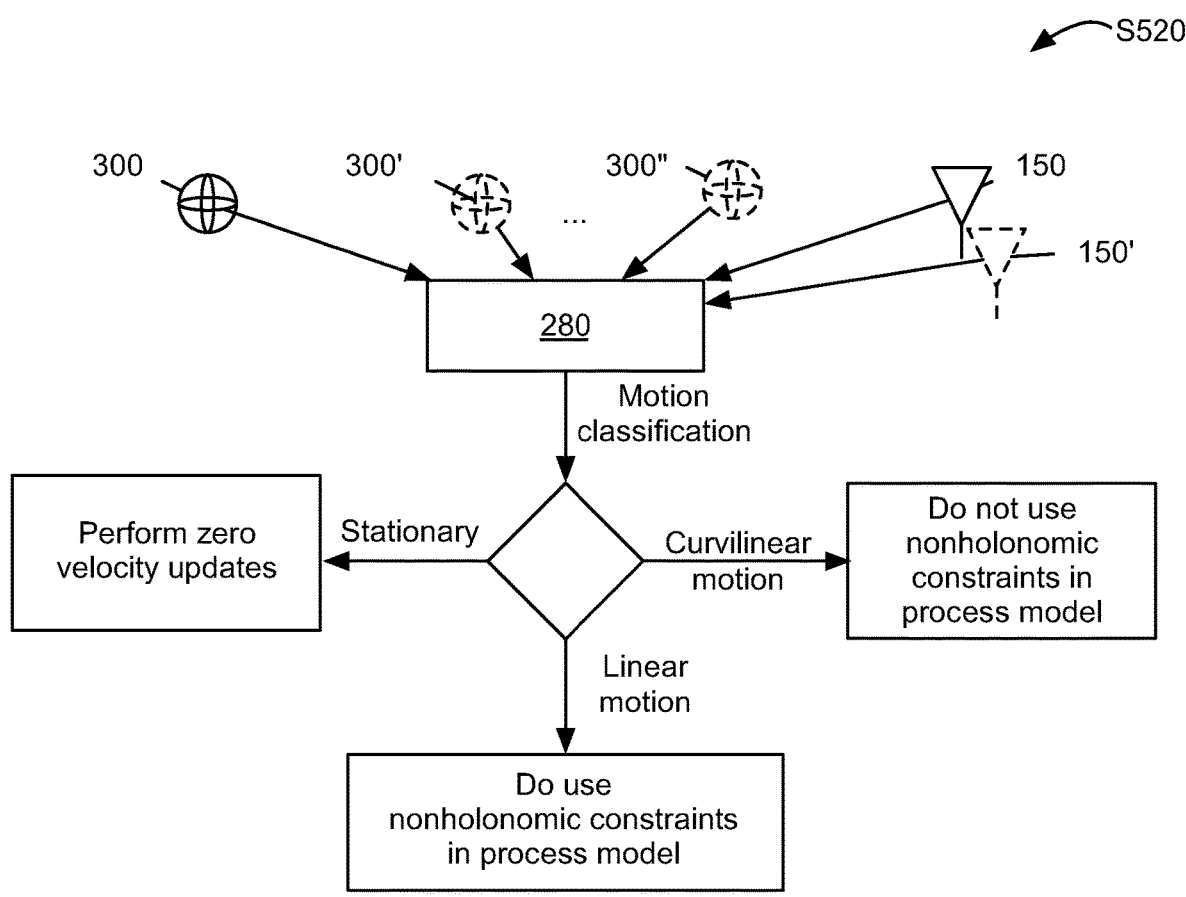
FIG. 8 is a schematic representation of an example of modifying a filter operation based on a motion state of a GNSS receiver.

In some variations, the first and second examples can be combined (as shown for example in FIG. 8). For instance, the nonstationary mode can include a rectilinear motion and a curvilinear motion mode (i.e., the system can operate between three or more modes, between two modes where one mode includes two or more submodes, etc.). However, the system can operate in any suitable mode(s).

4. Method

The method preferably functions to determine kinematic parameters of a moving body (e.g., mobile receiver, external system, sensor, GNSS receiver, etc.) based on sensor data and/or GNSS observations. The kinematic parameters can include: position, speed, velocity, acceleration, jerk, jounce, derivatives of the position with respect to time, heading, attitude, errors associated therewith, covariances therebetween, and/or any suitable parameters. For example, the kinematic parameters can include (e.g., refer to) PVA and/or PVT solutions. The kinematic parameters can be relative (e.g., to a reference point, to a reference location, etc.) or absolute (e.g., absolute coordinates). The kinematic parameters can be determined, for example, in north east down (NED) frame, east north up (ENU) frame, earth centered earth fixed (ECEF) frame, body frame, a geocode, coordinates (e.g., map coordinates, spherical coordinates, etc.), a WGS84 coordinate frame (e.g., a latitude, longitude, and altitude in WGS84 coordinates), a distance from a reference point (e.g., x meters north, y meters east, z meters below a reference point), and/or in any coordinate frame(s).

The method and/or steps thereof can be performed in real- or near-real time (e.g., with sensor data acquisition, with GNSS observations, with external system operation, moving body motion, etc.), delayed, offline, and/or with any timing. In some embodiments, the method can include real-time processes and lagging processes. In these embodiments real-time can be defined with respect to the lowest latency data source (e.g., allowing a propogation of the kinematic parameters before additional higher latency data from other sources is acquired), with respect to highest rate data source (e.g., such that the positioning solution using the highest rate data source is computed before additional data is acquired), relative to a velocity of the sensor and/or receiver, and/or with respect to any suitable data source. For example, when a system includes an IMU sensor and a GNSS receiver, the lowest latency data source can be the IMU sensor. However, the GNSS receiver can be the lowest latency data source (e.g., by down sampling IMU readings) and/or GNSS receiver and IMU sensor can have the same data rate. However, real-time can be otherwise defined.

Figure 5:
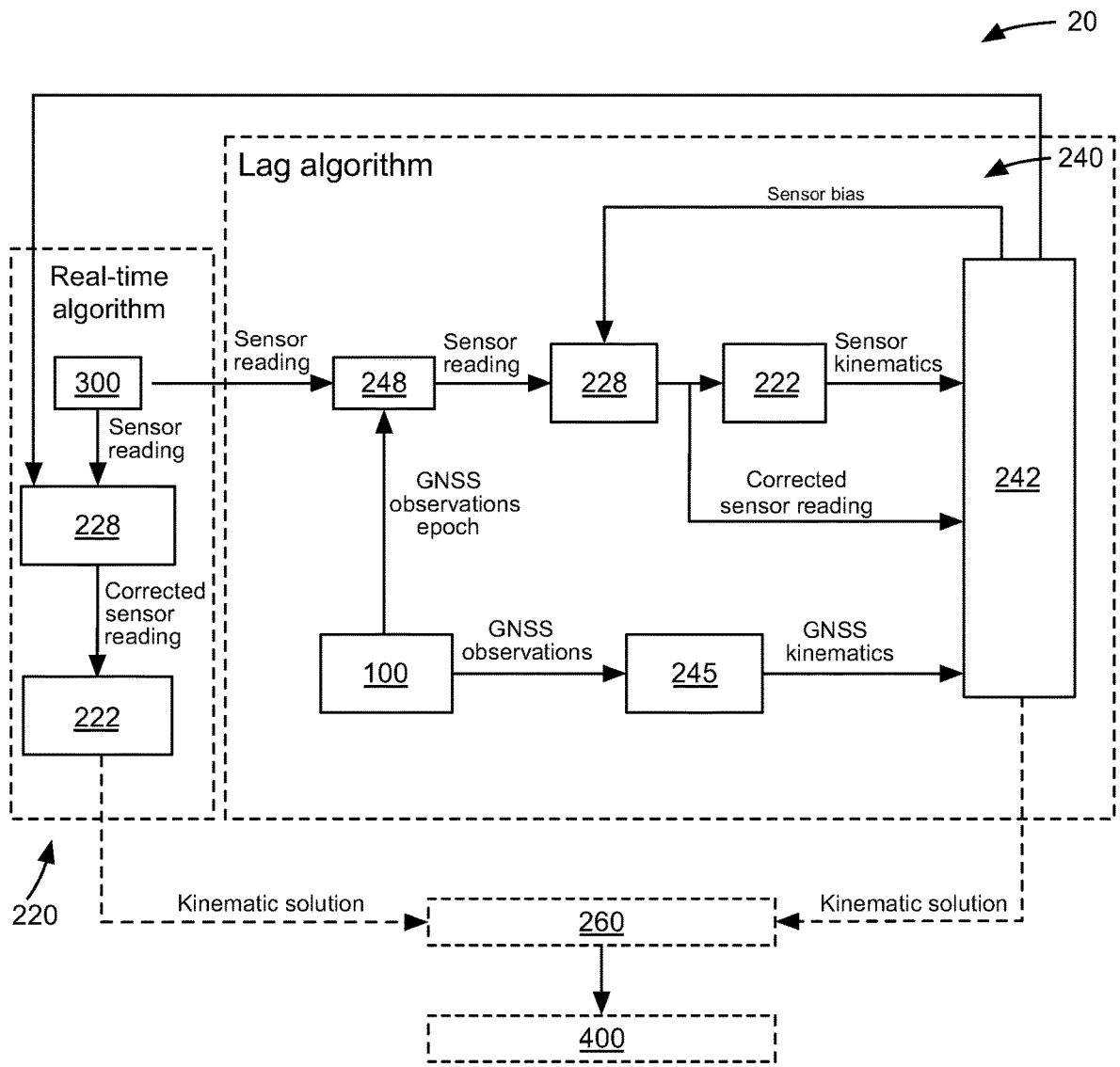
FIG. 5 is a schematic representation of data flow in an embodiment of the method.

The real-time processes preferably function to determine the kinematics parameters at a high frequency (e.g., a frequency based on a sensor or GNSS receiver position output rate or signal acquisition, high rate data sources, low-latency data sources, IMU sensor, magnetometer, etc.) to ensure that a positioning solution is essentially continuously available. In an illustrative example as shown in FIG. 5, the real-time process can include determining the kinematics parameter(s) from the sensor data (e.g., according to steps S100, S400, S520, S540, etc.).

The lagging processes can function to update (e.g., historically update, update future iterations, update the current iteration, etc.) and/or improve the real-time process's kinematic parameters (e.g., an accuracy or integrity of the kinematic parameters determined using the real-time process), to determine key kinematic parameters which the real-time process is referenced to, and/or otherwise function. The lagging process typically, but not always, is performed with a latency (e.g., a lag, a delay) relative to the real-time process, but can be performed at any frequency. The lagging process latency is preferably determined based on the data source with the highest latency with respect to the real-time process data source (e.g., the GNSS receiver, camera, wheel ticks, high frequency visual odometry, etc.). However, the lagging process latency can be determined based on a sensor, GNSS receiver, a plurality of lagging processes can be performed for each data source with different latencies (e.g., and a plurality of associated real-time processes can be performed for each set of data sources), and/or can depend on any suitable data source. In an illustrative example as shown in FIG. 5, the lagging process can include determining the kinematic parameters based on the GNSS observations and/or (concurrently-measured) sensor data (for example according to steps S100, S200, S300, S400, S500, etc.).

High rate, high-latency data (e.g., associated with wheel tick, steering angle, high frequency visual odometry, LIDAR, etc.) can be handled, for example, by increasing a latency budget (e.g., by tuning the lagging process timing, lag delay, etc.), downsampling measurements, expand the lagging process to handle multiple delayed measurements (e.g., with different delays, different rates, etc.), and/or can otherwise be handled.

However, the real-time and lagging processes can be otherwise defined and/or related.

Receiving sensor data S100 functions to receive data from one or more sensors. The sensor data is preferably received by a computing system, but can be received by any suitable component. The sensor data can be received from a sensor, a computing system (e.g., database, etc.), and/or from any suitable system. In variants, the sensor data can be acquired from a plurality of sensors (e.g., redundant sensors, different sensor types, common sensor types, etc. such as 2 sensors, 3 sensors, 4 sensors, 5 sensors, 10 sensors, etc.). The sensor data is preferably received (e.g., acquired) at a sensor acquisition frequency. The sensor data is preferably associated with a timestamp. The timestamp is preferably the time the data was acquired but can be the time of receipt (e.g., by the computing system), the time of processing, and/or be any suitable time. In a first illustrative example, receiving sensor data can include receiving acceleration and/or rotation data from an accelerometer and/or gyroscope. In a variation of the first illustrative example, the sensor data can include a first and second IMU data set acquired using a first and second IMU sensor (e.g., accelerometer, gyroscope, magnetometer, etc.). In a second illustrative example, receiving sensor data can include acquiring one or more images, where the images can be processed (e.g., using artificial intelligence, manually, using image processing algorithms, using stereoimage algorithms, monocular vision algorithms, etc.). In a third illustrative example, receiving sensor data can include measuring or receiving wheel tick (or other odometry or distance measuring instrument) and/or steering angle data. In a fourth illustrative example, any or all of the preceding three examples can be combined. However, any suitable sensor data can be received.

Receiving one or more satellite observations S200 preferably functions to measure (e.g., at the antenna(s), at reference station(s), etc.) and/or access one or more set of satellite observations (e.g., carrier phase measurements, pseudo-range measurements, etc.) from one or more observed satellites. The satellite observations are preferably accessed or received by a computing system (e.g., transmitted from a GNSS receiver to a computing system or processor), but can be accessed by any component. The satellite observations (and/or corrections) can be measured by a GNSS receiver, retrieved from a database (e.g., retrieve stored satellite observations; retrieve stored corrections; retrieve an almanac such as of weather conditions, tides, etc.), and/or be otherwise received. S200 can include receiving Doppler measurement data and/or any suitable data. The satellite observations can include signals from one or more satellite constellations. Each set of satellite observations preferably corresponds to a plurality of satellite constellations. The satellite observations can include signals from one or more satellite frequencies. However, one or more sets of satellite observations can correspond to a single satellite constellation.

S100 and S200 can be performed concurrently (e.g., simultaneously, contemporaneously, etc.), S100 can be performed before S200, S200 can be performed before S100, and/or S100 and S200 can be performed with any timing. Typically, but not always, S100 will be performed multiple times while S200 is being performed (e.g., several sets of sensor data each associated with a different timestamp will be acquired while a single set of satellite observations is acquired). S100 and S200 can be performed synchronously or asynchronously.

The satellite observations received in S200 are preferably measured at a GNSS observation frequency. The GNSS observation frequency can be less than, the same as, and/or greater than the sensor acquisition frequency. The satellite observations are preferably associated with a satellite observation timestamp. The satellite observation timestamp is preferably the epoch associated with the satellite observations, but can additionally or alternatively be the time of receipt, time of processing, and/or any suitable time.

Synchronizing the sensor data and GNSS observations S300 functions to align the sensor data and GNSS observations. S300 is preferably performed by a computing system and/or using any system. The sensor data is preferably synchronized to (e.g., time aligned) to the satellite observations. However, the sensor data and satellite observations can be aligned to an external reference and/or otherwise be synchronized. In an illustrative example as shown in FIG. 5, the satellite observation epoch can be transmitted to a buffer (e.g., memory) that stores the sensor data. The buffer can then transmit the sensor data acquired closest to the epoch, interpolated sensor data (e.g., between two or more set of sensor data associated with timestamps on either side of the epoch) that corresponds to the epoch and/or any sensor data based on the epoch. The buffer can be emptied after the synchronized sensor data is retrieved, retained for a predetermined amount of time, retained until a predetermined amount of data is acquired, and/or otherwise be emptied.

Correcting the sensor data S400 functions to apply a correction of errors (e.g., systematic errors, sensor errors, bias, scale factors, etc.) to the sensor data to remove or reduce the contribution of errors to the kinematic parameter solutions determined from the sensor data. S400 is preferably performed before S500, but can be performed during (for instance, when the mechanization model applies the sensor error correction) and/or after S500. S400 is preferably performed by a computing system (e.g., an error compensator, an error estimator, an IMU error estimator, a mechanization module, etc.) and/or any component. The error correction can include an offset (e.g., constant) in the sensor data, higher order error corrections (e.g., linear bias, quadratic bias, nonlinear bias, scale factor nonlinearity, cross-axis sensitivity, etc.), other error terms (e.g., scale factor, scale factor error, orthogonality errors, misalignment, g-sensitivity, $g^2$-sensitivity, etc.), and/or any suitable error in the sensor data. In a specific example, the error correction can include only the offset (e.g., only a constant) for an IMU sensor (e.g., 1 offset for accelerometer, 1 offset for the gyroscope, etc.). For instance, a error correction associated with an IMU sensor can account for six states (e.g., 1 per x/y/z direction for each of the accelerometer and the gyroscope). However, fewer than six states and/or more states can be accounted for in the error correction.

The error correction is preferably determined based on the GNSS data stream and the IMU data stream, but can be determined based on a plurality of IMU data streams, a plurality of GNSS data streams, a single IMU data stream, a GNSS data stream, an error model (e.g., a bias model), an auxiliary sensor stream (e.g., temperature, humidity, pressure, magnetometer, etc.), and/or based on any suitable data. The error correction is preferably determined using a sensor fusion engine, but can be determined by any suitable component. The error correction is preferably determined using a loose coupling between the GNSS data stream and the IMU data stream (e.g., kinematics are independently determined by each stream and the independent streams are converted into kinematic solutions where the fusion engine ingests the kinematic solutions), but can use tight coupling (e.g., where the fusion engine ingests the data streams or measurements before determining the kinematic solutions), and/or using any suitable coupling (e.g., a mixed solution such as using a kinematic solution for one data stream and measurements from the other data stream). However, the error correction can otherwise be determined.

In general, the error(s) change over time (e.g., due to vibrations, temperature, shock, drift, etc.) and therefore the error correction is preferably periodically updated (e.g., using a lagging process as described above). In an illustrative example, the sensor data can be corrected by subtracting the offset correction. However, the sensor data can be otherwise corrected.

As the error correction changes, intermediate kinematic parameters (e.g., PVA solutions such as those calculated by instances of the real-time algorithm that were implemented between the previous and current instance of the lagging algorithm operation) can be retroactively corrected (e.g., the real-time solutions can be retroactively modified based on the current error correction), can be interpolated between (e.g., error corrections at two or more times can be interpolated between and the PVA solutions can be updated based on the interpolated values), can be prospectively corrected (e.g., the current error corrections can be applied to the current and future measurements or implementations of the real-time algorithm), can be applied subject to a threshold criterion (e.g., threshold change in error correction before updating the error correction), and/or can be applied in any suitable conditions.

Determining the kinematic parameters S500 functions to determine kinematic parameters of the sensor, GNSS receiver, and/or external system. S500 is preferably performed by a computing system (e.g., an error estimator, mechanization module, integration module, filter, state estimator, etc.), but can be performed by any component. The kinematic parameters can be determined from different data streams (e.g., sensor data, GNSS observations, etc.) independently (e.g., loosely couple different data sources), in a dependent manner (e.g., tightly couple different data sources), and/or in any suitable manner.

The kinematic parameters and/or the method for determining the kinematic parameters can depend on a motion state (e.g., of the external system, the sensor(s), the GNSS receiver(s), etc.), a system mode, a data quality, an application, a target accuracy and/or integrity of the kinematic parameters, and/or any suitable information. Examples of data quality metrics can include: the presence and/or number of outliers in the data; a satellite dilution of precision (DOP) such as horizontal dilution of precision (HDOP), vertical dilution of precision (VDOP), position dilution of precision (PDOP), time dilution of precision (TDOP), and/or geometric dilution of precision (GDOP); multipath; atmospheric effects; and/or any suitable data quality metrics.

In a first illustrative example, when PDOP for a GNSS receiver meets or exceeds a threshold (such as a value of 2, 3, 4, 5, 6, 7, 8, 9, 10, 15, 20, etc.), the GNSS observations can be excluded from determining the kinematic parameters (e.g., until the PDOP meets or is below the threshold).

S500 can include determining a motion state S520, determining kinematic parameters using sensor data S540, determining kinematic parameters using GNSS observations S560, fusing the kinematic parameters S580, and/or any suitable step(s).

Determining a motion state S520 functions to determine a motion state of the moving body (e.g., the external system, the rover, the GNSS receiver, the sensors, etc.). The motion state can include rectilinear motion, non-rectilinear motion, stationary (e.g., not moving), near-stationary (e.g., velocity less than a threshold, potentially not moving, etc.), acceleration, deceleration, and/or any suitable states. The motion state can be determined based on the sensor data, the GNSS data, auxiliary data, a kinematic parameter (e.g., determined in S540, S560), a time threshold, and/or in any manner. The motion state can be determined using machine learning, deep learning, empirically, a rule set, in response to data or information achieving a threshold value, and/or in any manner.

In a first specific example, when a gyroscope reading (e.g., instantaneous reading, average reading such as time average, average between a plurality of gyros, etc.) exceeds a gyroscope threshold, the motion state can be assigned to nonrectilinear (e.g., curved) motion. In a second specific example, when a gyroscope reading is less than or equal to a gyroscope threshold, the motion state can be assigned to rectilinear motion, near-stationary, and/or stationary motion. In a third specific example, when an accelerometer reading (e.g., corrected for gravity, corrected for fictitious forces, uncorrected, etc.) is less than a threshold, the motion state can be identified as near-stationary and/or stationary. In a fourth specific example, particularly but not exclusively when an immediately previous motion state is near-stationary, the motion state can transition to stationary after a time threshold has elapsed (and no change(s) have been detected). The time threshold is preferably determined based on a latency of data measurements (e.g., GNSS latency, sensor latency, etc.), but can be independent of a data measurement latency. Examples of time thresholds include: 1 ms, 10 ms, 100 ms, 1 s, 10 s, and/or values or ranges therebetween. However, the time threshold can be less than 1 ms or greater than 10 s. In a fifth specific example, particularly but not exclusively when an immediately previous motion state is near stationary, the motion can be updated based on a measured velocity (e.g., using wheel tick, GNSS observations, sensor data, etc.). When the measured velocity is less than a threshold, the motion state can transition to a stationary state. When the measured velocity is greater than a threshold, the motion state can transition to a rectilinear motion. The fifth example can be particularly beneficial during uniform motion (e.g., highway driving) where the moving body can experience little to no forces (and therefore appear stationary to an accelerometer). In a sixth example, the motion state of the moving body can be determined by comparing kinematic parameters (e.g., a current and previous kinematic parameter). For instance, when a change in two (or three) directions is correlated or exceeds a threshold, the motion state can be curvilinear. When a change in two (or three) directions is uncorrelated or does not exceed a threshold, the motion state can be stationary (e.g., when there is no change, a change that is comparable to a noise level of the data, a change comparable to an accuracy limit of the process, etc.), near-stationary (e.g., when there is no change, a change that is comparable to a noise level of the data, a change comparable to an accuracy limit of the process, etc.), and/or rectilinear (e.g., when there is a change in only one direction, when a change in one direction exceeds a change in an orthogonal direction, etc.). In a seventh specific example, a motion state can be determined based on doppler data from the satellite observations. For instance, doppler can be used to estimate (e.g., determine) a receiver (or other moving body) velocity, where a motion state can be determined based on the velocity (e.g., a stationary state can be associated with zero or near-zero velocity such as a within an accuracy of the process, within 3 standard deviations of the accuracy of the estimate, after a near-stationary state was identified, etc.; a near-stationary state can be associated with zero or near-zero velocity such as a within an accuracy of the process, within 3 standard deviations of the accuracy of the estimate, before a stationary state was identified, etc.; a rectilinear or curvilinear motion can be associated with a non-zero velocity, a velocity greater than a standard deviation of a calculation, a velocity greater than a target value, etc.; etc.). In an eighth example, a motion state can be determined based on a plurality of images (e.g., based on a perspective of a shared feature between images, egomotion determined based on the images, etc.). In a ninth example, a motion state can be determined using a classifier (e.g., artificial intelligence, look-up table, etc.) to process GNSS data, sensor data, kinematic parameters, and/or any suitable inputs to classify or determine a probability of a motion state class. However, the motion state can be determined in any manner.

The motion state is preferably used to modify and/or determine how to determine the kinematic parameter (e.g., kinematic parameters determined within a given time window associated with the motion state). However, the motion state can otherwise modify the filter, data streams (e.g., satellite signals, IMU readings, kinematic parameters, etc.), and/or any suitable data, computing system component, and/or information. In a first illustrative example, when the motion state is rectilinear (or near-stationary), a nonholonomic constraint can be applied when estimating the kinematic parameters. In a second illustrative example, when the motion state is stationary, an apparent change in motion parameters can be monitored to infer, track, and/or otherwise determine a change in a hidden state (e.g., error correction; error terms; IMU bias; systematic error terms; states that can not be directly observed, measured, etc.; etc.). In a third illustrative example, when the motion state is stationary, one or more kinematic parameters (such as velocity, attitude, heading, etc.) can be stored (e.g., from a previously calculated kinematic parameter) and not updated until the motion state changes. For instance, zero-velocity updates (ZUPT) can be used in the IMU kinematic parameter determination. In a fourth specific example, when the motion state is stationary, one or more methods for determining the kinematic parameters can be halted. For instance, the kinematic parameters can be determined only using sensor data, only using GNSS observations, using a subset of data (e.g., a single GNSS frequency, a single GNSS constellation, a threshold number of satellites, etc.), and/or in any manner. However, additionally or alternatively, a rate of kinematic parameter determination can change (e.g., depending on a motion state), the kinematic parameters can be fused or not fused (e.g., S500 can include or exclude S580), and/or otherwise function. In a fifth specific example, when the motion state is curvilinear (or near-stationary), non holonomic constraints can be relaxed and/or not used when estimating the kinematic parameters. However, the method can be modified in any manner based on the motion state.

Figure 4:
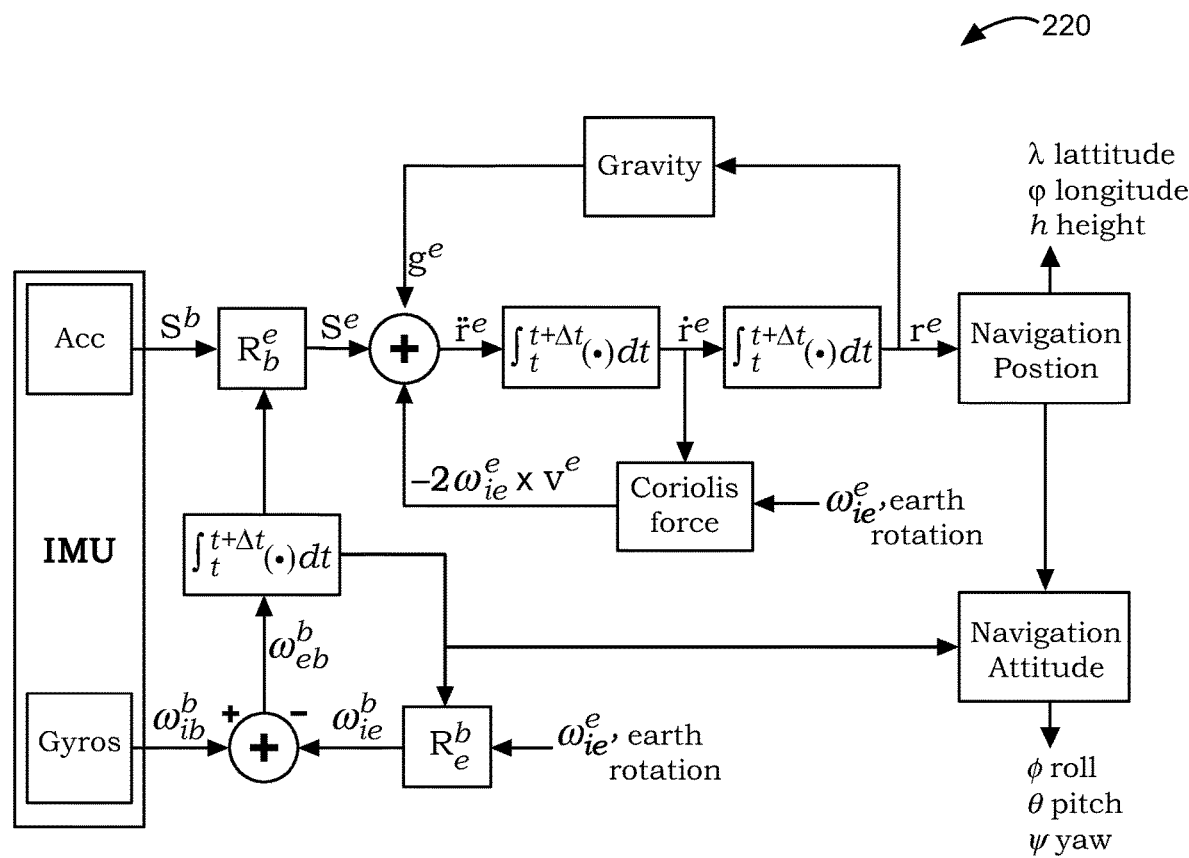
FIG. 4 is a schematic representation of an example of a mechanization (and integration) model for determining kinematic parameters using IMU sensor data.

Determining kinematic parameters using sensor data S540 functions to determine the kinematic parameters of the external system, sensor, and/or GNSS receiver based on the sensor data. S540 is preferably performed as sensor data is received, but can be performed at a delayed time (e.g., as GNSS observations are received), and/or with any suitable timing. S540 preferably includes determining the kinematic parameters using a mechanization model and integrating the mechanized data. In an illustrative example as shown in FIG. 4, the mechanization model and integration can account for earth rotation, Coriolis forces, gravity and/or any other real or fictitious forces to calculate kinematic parameters or update the kinematic parameters from a previously computed kinematic parameter. However, the kinematic parameters can be otherwise determined from the sensor data. When sensor data associated with a plurality of sensors is measured, S540 can be performed independently for sensor data from different sensors, sensor data for different sensors can be merged and/or determined in a unified manner, and/or the kinematic parameters can otherwise be determined. The mechanization model preferably uses (e.g., leverages) small angle approximations, which can provide a technical advantage of simplifying the mechanization model (e.g., which can decrease a computational burden of the mechanization model). However, the mechanization model and/or integrator can otherwise function.

Determining kinematic parameters using GNSS observations S560 functions to determine the kinematic parameters of the external system, sensor, and/or GNSS receiver based on the GNSS observations. S560 is preferably performed as GNSS observations are received, but can be performed as the sensor data is received and/or with any suitable timing. The kinematic parameters can be determined in a manner analogous to the determination of position, velocity, and/or attitude as disclosed in U.S. patent application Ser. No. 16/685,927 filed 15 Nov. 2019 entitled "SYSTEM AND METHOD FOR SATELLITE POSITIONING," U.S. patent application Ser. No. 16/817,196 filed 12 Mar. 2020 entitled "SYSTEMS AND METHODS FOR REAL TIME KINEMATIC SATELLITE POSITIONING," and/or U.S. patent application Ser. No. 17/022,924 filed 16 Sep. 2020 entitled 'SYSTEMS AND METHODS FOR HIGH-INTEGRITY SATELLITE POSITIONING,' each of which is incorporated in its entirety by this reference. However, the kinematic parameters can be determined from the GNSS observations in any manner. When GNSS observations associated with a plurality of GNSS receivers (e.g., antennas) are measured, S560 can be performed independently for GNSS observations from different GNSS receivers and/or S560 can be performed in a manner that merges the GNSS observations for different GNSS receivers.

In a variant of S560, the kinematic parameters can be determined using carrier phase from the satellite observations (e.g., without using pseudorange, with using pseudorange, without using doppler, with doppler, etc.). For example, the kinematic parameters can be determined by: determining a set of floating integer phase hypotheses associated with a carrier phase of the satellite signals (e.g., using a filter such as a Kalman filter), determining a set of integer phase ambiguity hypotheses using an integer search algorithm (e.g., LAMBDA, MLAMBDA, etc.), and performing hypothesis testing (e.g., a ratio test, Bayesian testing, determining a ratio between likelihoods of two integer phase ambiguity hypotheses, etc.) on the set of integer phase ambiguity hypotheses, wherein the hypothesis testing comprises, where a set of integer phase ambiguities that pass the hypothesis test are used to determine the kinematic parameters (e.g., receiver position, PVA solution, receiver velocity, etc.)

Fusing two or more kinematic parameters S580 functions to determine a kinematic parameter associated with the moving body (e.g., external system, sensor(s), GNSS receiver, etc.) from the kinematic parameters determined in S540 and/or S560. The different kinematic parameters are preferably loosely coupled, but can be tightly coupled, independent, and/or otherwise be related. Fusing the kinematic parameters can include averaging the kinematic parameters, voting (e.g., to determine or select a best kinematic parameter), applying an error estimator (e.g., a filter) to merge the kinematic parameters (e.g., using a separate error estimator from the error estimator of S540 and/or S560, using the same error estimator as S540 and/or S560, etc.), and/or otherwise fusing the kinematic parameters. In an illustrative example, the kinematic parameters can be fused using a Kalman filter (e.g., a linear Kalman filter, an extended Kalman filter, an unscented Kalman filter, etc.). Inputs to the error estimator can include: kinematic parameters determined from synchronized sensor data and GNSS observations, kinematic parameters from sensor data, kinematic parameters from GNSS observations, previously stored kinematic parameters, error corrections (e.g., prior error corrections, sensor calibrations, etc.), sensor data, GNSS observations, GNSS corrections (e.g., provided by or received from a GNSS corrections system), and/or any suitable inputs. The state determined by (e.g., the output from) the error estimator can include sensor error corrections (e.g., systematic sensor error corrections, sensor bias, accelerometer bias, gyroscope bias, etc.), kinematic parameters (e.g., position; velocity such as average velocity, instantaneous velocity, etc.; attitude; PVA solutions; PVT solutions; etc.), previous kinematic parameters (e.g., where the previous kinematic parameters can be updated or not updated), residuals thereof, covariances thereof, and/or any suitable states. The sensor corrections output by the error estimator are preferably used to correct and/or update the sensor data (e.g., provide a historic correction to previous data, update the systematic sensor error corrections to correct current or future sensor readings, etc.) as in S400.

Figure 3:
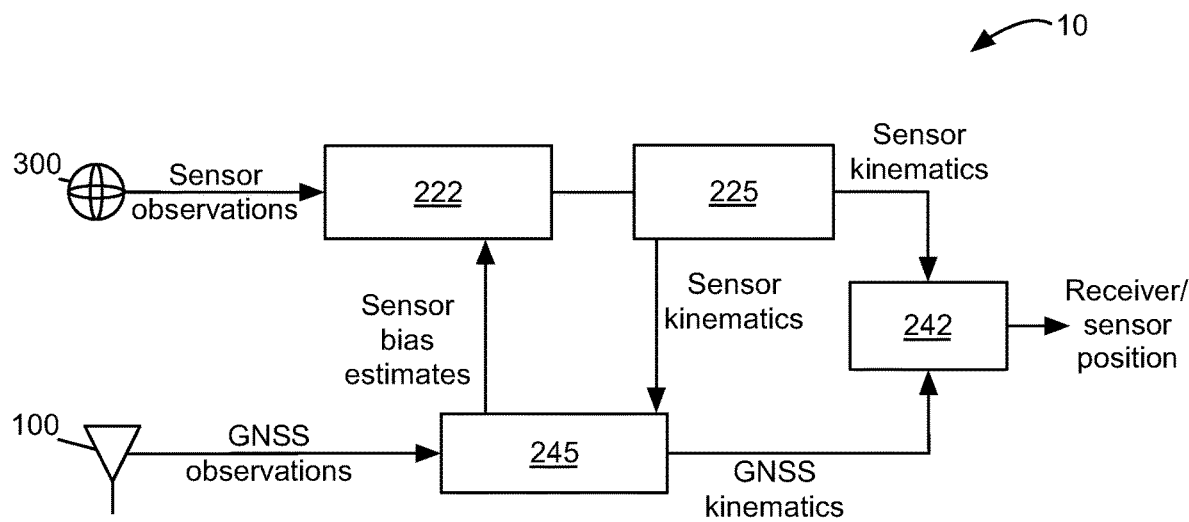
FIG. 3 is a schematic representation of an example of fusing a GNSS positioning solution and a sensor positioning solution.

As shown for example in FIG. 3, fusing the kinematic parameters can include: providing the GNSS derived kinematic parameters to an estimator (e.g., Kalman filter), determining sensor derived kinematic parameters using a mechanization module and integration module, determining sensor error estimates using the estimator, correcting the sensor observations based on the error estimates, and determining moving body kinematic parameters based on the sensor-derived kinematic parameters and/or the GNSS receiver derived kinematic parameters. However, the kinematic parameters can be fused in any manner.

S500 can include initializing the kinematic parameters S590 (e.g., for the sensor data derived kinematic parameters, for the GNSS observation derived kinematic parameters, etc.), which functions to facilitate or speed up the determination of the kinematic parameters (e.g., upon method initialization, after a filter divergence, after tracking loss, after a threshold duration of sensor signal loss, after a threshold duration of GNSS signal loss, after identifying a potential fault, after the moving body stops, etc.). The kinematic parameters can be initialized to a previously determined kinematic parameter (e.g., from a previous instance of the method, before the moving body was stopped, etc.), a kinematic parameter derived from a different data source (e.g., a GNSS-derived kinematic parameter for the sensor data, a sensor-derived kinematic parameter for the GNSS observations, etc.), a user input initial value, a modeled initial value, a random or pseudorandom initial value, and/or any suitable initial value. The initial value is preferably used S540, S560, and/or S580 as an initial value for the estimator which can be beneficial for speeding up a convergence of one or more error estimator or filter.

The kinematic parameters (particularly but not exclusively the attitude) are preferably initialized when the velocity of the moving body is at most a threshold velocity (e.g., 0.1 m/s, 0.5 m/s, 1 m/s, 2 m/s, 3 m/s, 4 m/s, 5 m/s, 7 m/s, 10 m/s, 20 m/s, values therebetween, etc.). However, the kinematic parameters can be initialized when the velocity of the moving body exceeds a threshold velocity, independent of the velocity of the moving body, and/or in any suitable condition.

In an illustrative example, the attitude can be initialized to a previous attitude (e.g., a stored attitude from before a moving body ceases operation), to an attitude determined from two previous epochs or time points of GNSS observations (e.g., based on an average velocity determined therefrom), and/or in any manner. In variations of this illustrative example, the attitude can be improved using velocity thresholds, classification (e.g., classifying the motion of the external system as forward or backward), auxiliary inputs (such as wheel tick sensor measurements, steering angle, etc.), external signals (e.g., transmission signals such as forward or reverse), and/or any suitable inputs to disambiguate whether the moving body is traveling forward or backward. In a second illustrative example, the attitude can be estimated by using two or more noncolinear vectors (e.g., in an ECF frame and body frame) and deriving or estimating a rotation matrix from these vectors using an alignment algorithm. The vectors used can be associated with different points in time. In a third specific example, a kinematic parameter (e.g., position, velocity, attitude, etc.) can be determined from (or based on) a nearest cellular tower, cellular tower trilateration, a WIFI signal, the last known receiver position, a satellite connection (e.g., satellite network), computer vision (e.g., to identify objects in the environment of the receiver), user input, reference station signal (e.g., a nearest reference station), a transponder signal, a previous receiver position (e.g., determined from a previous iteration of the method, receiver position calculated from the satellite observations without convergence, receiver position calculated from the satellite observations without validation, satellite observations such as using pseudorange to calculate an approximate receiver location, receiver position determined prior to an outage, etc.), inertial navigation (e.g., dead reckoning), pilotage, celestial navigation, and/or radio navigation (e.g., LORAN-C, Omega, Tacan, US Army Position Location and Reporting System, etc.). However, the kinematic parameters can be otherwise initialized.

S500 can include validating the kinematic parameters S595, which is particularly, but not exclusively, beneficial when the kinematic parameters are initialized using a previously determined kinematic parameter (e.g., to validate an initial kinematic parameter, to validate a kinematic parameter derived from an initially unvalidated kinematic parameter, etc.). The kinematic parameters can be validated based on the GNSS data, information derived from the GNSS data (e.g., PVA solutions derived from the GNSS data), sensor data, auxiliary sensor data, information derived from the sensor data (e.g., PVA solutions derived from the sensor data), fused data, and/or any suitable data.

Figure 7:
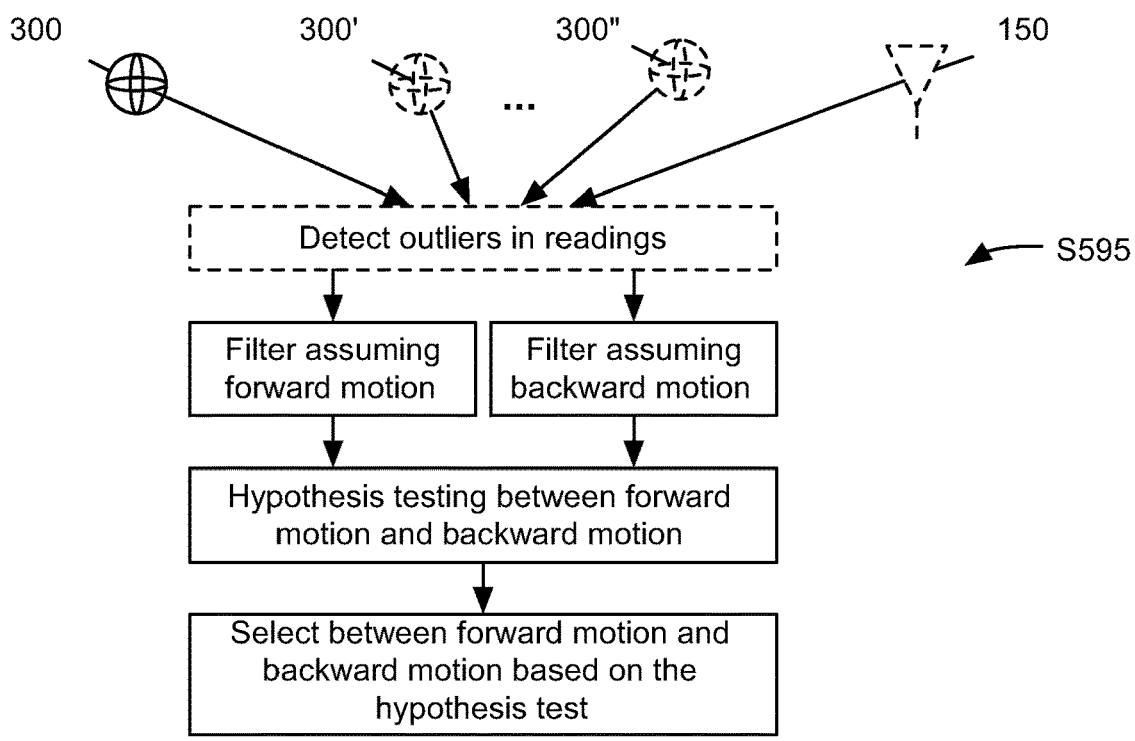
FIG. 7 is a schematic representation of an example of aligning a dead reckoning solution.

For example, validating the kinematic parameters can include estimating a covariance of the kinematic parameter (s) and performing a statistical test on the covariances (e.g., a chi-squared test, a ratio test, etc.); detecting inconsistencies (e.g., a threshold number of inconsistencies or faults) in the kinematic parameters and/or data used to determine the kinematic parameters; based on a comparison of kinematic parameters determined from sensor data and kinematic parameters determined using GNSS observations, and/or otherwise validating the kinematic parameters. In another example (as shown for example in FIG. 7), validating the kinematic parameters can include determining a first kinematic parameter and a second kinematic parameter (e.g., using a filter, using a sensor engine, using a mechanization model and integrator assuming a first and a second attitude, based on a moving body locality, an initial kinematic parameter, etc.), performing hypothesis testing (e.g., a ratio test, Bayesian testing, chi-square test, etc.) on the first and second kinematic parameter, and validating the first kinematic parameter based on the hypothesis test (e.g., when a ratio test is greater than or equal to 1 or another threshold value, where the first kinematic parameter can be invalidated and/or the second kinematic parameter can be validated when the ratio test is less than the threshold value). In this example, the first and second attitude can be forward and reverse, can be 180° out of phase, can be randomly generated, can be predetermined directions (e.g., cardinal directions, intermediate directions, etc.), and/or can otherwise be related. However, the kinematic parameters can otherwise be validated.

When the kinematic parameters are validated, the method can track a moving body kinematic parameter (e.g., determine a kinematic parameter by integrating a positioning solution), can operate the moving body, can generate operating instructions for the moving body, can determine kinematic parameters, and/or can otherwise operate or process. When the validation fails (e.g., the statistical test is not passed, a number of faults exceeds the threshold number of faults, the comparison fails, etc.), a new initial kinematic parameter can be used, the method can be restarted, additional data (e.g., S100 and/or S200) can be received, the kinematic parameter can be determined without an initial value (which can take longer to converge but may be more accurate), the moving body (e.g., sensor, GNSS receiver, etc.) can be aligned (e.g., an attitude can be determined using GNSS data, using sensor data, using a filter, using an error estimator, etc.), and/or any response can occur.

Monitoring an integrity of the kinematic parameters S600 functions to determine an integrity of the kinematic parameters. The integrity can include a protection level, alert limit, time to alert, integrity risk, and/or any suitable parameters. The integrity can refer to the integrity of the GNSS-based kinematic parameters, the sensor based kinematic parameters, the fused kinematic parameters, and/or any suitable kinematic parameters. The integrity of the kinematic parameters is preferably determined by a computing system (e.g., an integrity monitor), but can be determined by any component.

The integrity can be determined using sensor-based methods, system-based methods, and/or using any suitable methods. Examples of sensor-based methods include: comparing sensor readings (e.g., absolute values, changes in readings, etc.) to operating ranges (e.g., possible sensor readings, threshold vehicle acceleration, threshold external system angular velocity, etc.); comparing estimated sensor errors (e.g., determined in S500) to a specified error (e.g., expected error parameters, manufacturer specified bias such as a 5$\sigma$ bias value, etc.); comparing a computed measurement innovation (also referred to as a residual, such as determined in S500) or covariance thereof to a threshold measurement innovation or covariance; a statistical test (such as a Kolmogorov-Smirnov test) determining how closely the mahalanobis distance of innovation follows a target distribution (e.g., the chi-square distribution); and/or any suitable sensor-based integrity tests. Examples of system-based methods include: comparing a difference between kinematic parameters computed using separate data (e.g., acquired by distinct sensors, different subsets of sensor data from a single sensor, etc.) to a threshold; comparing kinematic parameters computed using separate data; using a RAIM, RAIM-like, and/or modified RAIM (e.g., ARAIM, RRAIM, ERAIM, as disclosed in U.S. patent application Ser. No. 17/343,327 titled 'SYSTEM AND METHOD FOR SATELLITE POSITIONING' filed 9 Jun. 2021 incorporated in its entirety by this reference, etc.) algorithm; checking convergence of the estimated states after a predetermined time; and/or any suitable system-based integrity test(s).

Monitoring the integrity of the kinematic parameters can include monitoring a data stream. When a data stream (e.g., sensor data, satellite signals, etc.) is interrupted, is unable to be fixed (e.g., an integer carrier phase ambiguity is unavailable, a float carrier phase is unavailable, etc.), experiences a discontinuity, and/or indicates anomalous data (e.g., outliers, a threshold number of outliers, a threshold number of consecutive outliers, etc.), the integrity of the kinematic parameters can become unstable (e.g., undeterminable, exceed allowable values, etc.). For instance, if a sensor stream is lost, kinematic parameters can rely solely on the GNSS data and the integrity can be invalidated rapidly (e.g., within 0.1 s, 0.5 s, 1 s, 5 s, 10 s, etc.). Similarly, if a GNSS stream (satellite signals) are lost or cannot be fixed, kinematic parameters can rely solely on the sensor data and the integrity can be invalidated rapidly (e.g., within 0.01 s, 0.05 s, 0.1 s, 0.5 s, 1 s, 5 s, 10 s, etc.). The risk of invalidation of the integrity of the kinematic parameters can be mitigated (e.g., reduced) by having redundant data streams (e.g., two or more sensors, two or more GNSS receivers or antennas, etc.). However, the data stream can otherwise be monitored for integrity risk(s).

When the methods indicate that a fault is likely and/or that the integrity of the kinematic parameters does not achieve a threshold integrity, S600 can include tagging the kinematic parameter (e.g., with an integrity, with a safety limit, etc.), flagging the kinematic parameter, restarting the method, removing a subset of the data used to determine kinematic parameter (e.g., when a fault is associated with GNSS observations, exclude GNSS observations from the determined kinematic parameters; when a fault is associated with sensor data, exclude the sensor from the determined kinematic parameters; etc.), redetermining the kinematic parameter, discarding the kinematic parameter, updating the operation instructions (e.g., determined in S700), and/or otherwise respond. When the methods indicate that no fault is likely and/or that the integrity achieves a threshold integrity, S600 can include tagging the kinematic parameters (e.g., with an estimated integrity), flag the kinematic parameters (e.g., as passing the integrity test), pass the kinematic parameters to S700, and/or otherwise respond.

In an illustrative example, monitoring an integrity can be performed in any manner as disclosed in U.S. patent application Ser. No. 17/022,924 filed 16 Sep. 2020 entitled 'SYSTEMS AND METHODS FOR HIGH-INTEGRITY SATELLITE POSITIONING,' which is incorporated in its entirety by this reference. However, monitoring integrity can be performed in any manner.

S700 can include generating instructions for operation of the external system based on the external system location. For example, operation instructions for a vehicle can include making lane adjustments to remain within a lane of traffic, turning instructions, and/or other instructions for traversing a path, obeying laws, providing safety, and/or other purposes. S700 can additionally or alternatively include operating the external system based on the operation instructions.

S700 can include determining an external system (e.g., vehicle) kinematic parameters and/or location based on the kinematic parameters (e.g., a posteriori updated INS outputs, kinematic parameters determined using the satellite signals, kinematic parameters determined using the sensor signals, fused kinematic parameters, etc.). The external system kinematic parameters can be determined based on a transformation from a GNSS receiver coordinate to an external system coordinate, a known relative position of the GNSS receiver to the external system, a transformation from a sensor coordinate to an external system coordinate, a known relative position of the sensor to the external system, and/or otherwise be determined. The external system kinematic parameters can be relative kinematic parameters (e.g., relative to the GNSS receiver, sensor, a reference location, etc.) and/or absolute kinematic parameters (e.g., coordinates). The external system kinematic parameters are preferably determined based on the sensor data kinematic parameters (e.g., corrected sensor kinematic parameters), but can additionally or alternatively be determined based on the GNSS observations derived kinematic parameters, fused kinematic parameters, and/or any suitable kinematic parameters.

Specific Examples

In a first specific example (as shown for example in FIG. 5), a sensor fusion system can include a sensor 300 (e.g., an IMU sensor, accelerometer, gyroscope, magnetometer, visual odometer, wheel tick, steering angle, camera, etc.), a GNSS receiver 100 (e.g., a GNSS antenna 150), a fusion engine 240, a sensor engine 220, and an integrity monitor 260. The sensor can function to measure sensor data (e.g., at a sensor data rate, with a sensor data latency, etc.). The GNSS receiver can function to receive satellite signals (e.g., code, carrier phase, Doppler, etc.) for one or more satellite frequencies, satellite constellations, and/or any suitable satellite(s) (e.g., at a GNSS data rate, with a GNSS latency, etc.). The fusion engine preferably functions to determine (e.g., estimate) kinematic parameters of the moving body and/or sensor error correction (e.g., bias estimates, systematic sensor error correction, etc.). The fusion engine can include a filter 242 (e.g., a Kalman filter, extended Kalman filter, unscented Kalman filter, etc.), an error model (e.g., to identify which sensor errors to estimate, how to estimate the sensor errors, etc.), a time synchronizer 248 (e.g., a buffer, which can function to temporally align data streams with different latency), a GNSS positioning engine 245 (e.g., which can function to resolve a carrier phase ambiguity, determine kinematic parameters from the GNSS data, a filter, etc.), and/or any suitable components. The sensor engine preferably functions to determine a kinematic parameter of the moving body based on the sensor data. The sensor engine can include a mechanization model 222 (e.g., built on a physical dynamic model that gets discretized, a set of equations or relationships to determine kinematic parameters from sensor data), an integrator 225 (e.g., a numerical integration model for applying the mechanization model to determine current kinematic parameters from a previous kinematic parameter, to propagate previous kinematic parameters to a current time, etc.), an error compensator 228 (e.g., which can correct sensor measurements for error estimates), a filter 242 (e.g., a Kalman filter, extended Kalman filter, unscented Kalman filter, etc.), and/or any suitable components. The integrity monitor 260 can function to monitor or detect potential faults in the kinematic parameter solutions (e.g., due to hardware such as GNSS receiver faults, sensor faults, control board faults, etc.; software such as design issues, bugs, etc.; external signals such as RF, etc.; etc.). The sensor fusion system can be mounted to an external system (e.g., robot, vehicle, agricultural equipment, etc.) and/or otherwise be used.

In the first specific example, the sensor data can be provided to the sensor engine. The sensor engine can determine a moving body PVA solution (e.g., a position, velocity, attitude, etc.) by integrating the (corrected) sensor data stream. The sensor PVA solution and the GNSS data can be provided to the fusion engine which can synchronize the GNSS data with the sensor data and/or the PVA solution, determine a PVA solution using the GNSS data, and estimate sensor error(s) based on the PVA solution from the sensor engine and the PVA solution from the GNSS data. The estimated sensor error can be provided to the sensor engine (e.g., error compensator). The integrity monitor can receive the sensor data stream, the GNSS data stream, the PVA solution from the sensor engine, the PVA solution from the GNSS data, the sensor error corrections, and/or any suitable information to monitor the PVA solution. In some variations, the sensor data and the GNSS data can be provided to the fusion engine (e.g., without determining intermediate PVA solutions).

In the first specific example, the sensor engine can initialize the PVA solution, validate the initial PVA solution, and/or can otherwise function.

In variations of the first specific example, the sensor fusions system can include two or more sensors and/or two or more GNSS receivers which can provide technical advantages of providing redundancy for the system. In these variations, the plurality of data streams can be processed by the same computing system components (e.g., engines, monitors, etc.) and/or by different computing system components (e.g., a sensor engine for each sensor, a sensor engine for a group of sensors, etc.). The leverarm between sensors and/or GNSS receivers is preferably known (e.g., at least to a threshold accuracy) but can be unknown (e.g., determined as a state of an error estimator).

Variations of the first specific example can include classifiers 280 which can function to classify a motion state of the sensor fusion system (e.g., based on a threshold velocity, based on a threshold acceleration, based on a threshold velocity component, etc.). The sensor engine, fusion engine, integrity monitor, and/or any suitable component can function in a manner that depends on the motion state (e.g., classified motion state). For instance, the sensor fusion system (e.g., a filter or mechanization model thereof) can apply nonholonomic constraints when the moving body is traveling in non-curvilinear motion (e.g., rectilinear motion, stationary, near-stationary, etc.) and can not apply nonholonomic constraints when the moving body is traveling in curvilinear motion. Additionally, or alternatively, the sensor fusion system (e.g., a filter or mechanization model thereof) can perform zero-velocity updates when the moving body is stationary and perform velocity updates when the moving body is nonstationary (e.g., near-stationary, rectilinear motion, curvilinear motion, etc.). However, the classifier can otherwise function and/or the sensor fusion system can otherwise function based on the classification.

Figure 6:
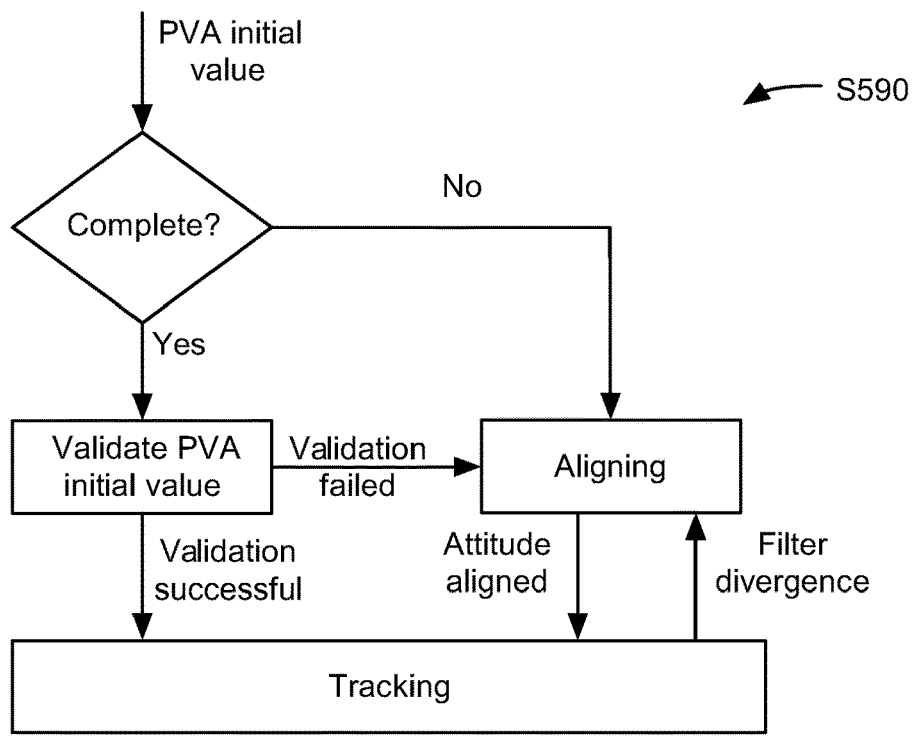
FIG. 6 is a schematic representation of an example of initializing a dead reckoning solution.

In a specific example of a method for determining a PVA solution can include: receiving a sensor data stream; receiving a GNSS data stream; determining a first PVA solution using the sensor data stream; determining a second PVA solution using the GNSS data stream; fusing the first PVA solution and the second PVA solution to determine a sensor error correction, where the sensor error correction is operable to correct a sensor error (e.g., sensor bias) in the sensor data. Fusing the first PVA solution and second PVA solution preferably includes time synchronizing the sensor data stream and the GNSS data stream. The method can include: monitoring an integrity of the PVA solution (e.g., first PVA solution, second PVA solution), operating a moving body based on the PVA solution (e.g., generating operation instructions based on the PVA solution), and/or any suitable steps. Determining the PVA solution can include (as shown for example in FIG. 6): initializing a PVA solution (e.g., an initial PVA solution) based on a previous PVA solution, and validating the initial PVA solution. Validating the initial PVA solution can include: determining a first test PVA solution with a first attitude (e.g., the initial PVA solution) and a second test PVA solution with a second attitude (e.g., the initial PVA solution with an attitude that is 180° out of phase from the initial PVA solution), performing hypothesis testing on the first test PVA solution and the second test PVA solution, determining a validation of the PVA solution based on the hypothesis testing (e.g., a ratio test value such as greater than or equal to 1 indicating a successful validation). When the initial PVA solution is not validated, the method can include aligning the sensor and/or GNSS receiver (e.g., determining an initial attitude; determining an attitude to a threshold accuracy such as 0.1°, 0.5°, 1°, 2°, 3°, 5°, 10°, values therebetween, an accuracy that depends on a velocity of the moving body, etc.; such as using GNSS data) before tracking a moving body PVA solution (e.g., determining a PVA solution), using the second test PVA solution (e.g., using the initial PVA solution with an inverted attitude for the initial PVA solution), and/or can otherwise operate. When the initial PVA solution is incomplete (e.g., does not include an initial position, initial velocity, and/or initial attitude), the method can generate a value for the missing data (e.g., randomly, inferred based on a prior state, inferred based on a moving body locality or approximate location, etc.), can align the body, and/or can otherwise respond.

In a second specific example, a method can be performed by a system as described in the first specific example of a sensor fusion system.

In a second specific example, a sensor fusion system can be configured to perform the method as described in the first specific example.

However, the system and/or method can include any suitable steps, components, component connections, and/or otherwise be configured.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments, variants, examples, and/or variations of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   receiving inertial measurement unit (IMU) data;
   receiving satellite observations;
   initializing a GNSS receiver position velocity attitude (PVA) solution with a prior global navigation satellite system (GNSS) PVA solution;
   validating the initial GNSS receiver PVA solution by performing hypothesis testing between a GNSS receiver PVA solution with a first attitude and a GNSS receiver PVA solution with a second attitude, wherein the initial GNSS receiver PVA solution is validated when an attitude of the prior GNSS PVA solution matches an attitude selected from the hypothesis testing; and
   when the initial GNSS receiver PVA solution is validated, determining a current GNSS receiver PVA solution based on the IMU data, the satellite observations, and the initial GNSS receiver PVA solution.

2. The method of claim 1, wherein the first attitude and second attitude are 180° out of phase.

3. The method of claim 1, further comprising:
   when the initial GNSS receiver PVA solution is not validated, aligning the IMU data to a threshold uncertainty in an attitude of the GNSS receiver; and
   determining the current GNSS receiver PVA solution based on the IMU data, the satellite observations, and the alignment.

4. The method of claim 3, further comprising: transitioning from determining the current GNSS receiver PVA solution to aligning the IMU data when a covariance of the PVA solution exceeds a threshold covariance.

5. The method of claim 3, wherein aligning the IMU data comprises determining the attitude of the GNSS receiver using the satellite observations, wherein the attitude is provided to a filter that processes the IMU data.

6. The method of claim 1 wherein determining the current GNSS receiver PVA solution comprises determining a GNSS PVA solution using the satellite observations and determining a dead reckoning PVA solution using the IMU data, wherein the GNSS PVA solution and the dead reckoning PVA solution are fused.

7. The method of claim 6, wherein the GNSS PVA solution and the dead reckoning PVA solution are fused using a loosely coupled model.

8. The method of claim 6, wherein the current GNSS PVA solution is determined at a first frequency and the dead reckoning PVA solution is determined at a second frequency, wherein the second frequency is greater than the first frequency, wherein fusing the GNSS PVA solution and the dead reckoning PVA solution comprises synchronizing the GNSS PVA solution and the dead reckoning PVA solution.

9. The method of claim 1, further comprising determining a motion state of the GNSS receiver, wherein determining the current GNSS receiver PVA solution depends on the motion state of the GNSS receiver.

10. The method of claim 9, wherein when the motion state comprises a curvilinear motion, not applying nonholonomic constraints in determining the current GNSS receiver PVA solution.

11. The method of claim 9, wherein when the motion state comprises less than a threshold velocity, determining the current PVA solution without using the satellite observations.

* * * * *